Patented Mar. 4, 1947

2,416,902

UNITED STATES PATENT OFFICE 2,416,902

METHOD OF HYDROGENATING PINENE RESIN

William H. Carmody, deceased, late of Springfield, Ohio, by Marie O. Carmody, administratrix, Springfield, Ohio, assignor to Carmody Research Laboratories, Inc., Springfield, Ohio, a corporation of Ohio No Drawing. Application December 3, 1943, Serial No. 512,784

3 Claims. (Cl. 260—80)

This invention relates to the hydrogenation of pinene resin. The application herein is a continuation-in-part of the application of William H. Carmody, Serial No. 280,128, filed June 20, 1939.

Pinene resins, by which is meant those terpene resins of varying melting point which are composed of terpene polymers having the formula $(C_{10}H_{16})_n$ and respond to the pinene structure, and which are represented chiefly by resins composed preponderantly of polymers of beta-pinene, alpha-pinene, and mixtures of them, previously have been hydrogenated under the catalytic effect of Raney nickel catalyst and similar metal catalysts, as is patent of Marie O. Carmody, No. 2,249,112, dated July 15, 1941.

Pinene resins are of good light color and do not tend to yellowing in an order which detracts substantially from their utility. They also have good solubility in aliphatic hydrocarbon solvents, such as petroleum benzine and the like. One deteriorating effect to which pinene resins are subject on aging is oxidation, which leads to the development of embrittlement or incompatibility in compositions in which the pinene resin is included. The most active metal hydrogenation catalyst for resins, which is Raney nickel, is relatively expensive to use because of its initial high cost, its susceptibility to catalyst poisons, and the difficulties attendant upon its storage.

The object of this invention is to provide a method of hydrogenating pinene resin in a manner effectively to inhibit oxidation in the resin on aging under the hydrogenation-inducing effect of a catalyst practice with which is less expensive than with Raney nickel, and hydrogenation with which is adequately effective in preparing pinene resin for certain associations and uses.

In accordance with this invention, hydrogenation of pinene resin is conducted in the presence of and under the catalytic effect of black copper oxide. It was not to be anticipated that this catalyst would exercise a hydrogenation-inducing effect under the moderate temperature conditions requisite for the hydrogenation of pinene resin. The general practice in the use of the metal oxide catalysts, such for example as the metal chromite catalysts and copper oxides, is to hydrogenate at relatively high temperature, and the pinene polymers show a marked tendency to decompose at temperatures above 250° C. and below those at which hydrogenation under the influence of metal oxide catalysts previously has been conducted, as in the synthesis of methanol and like processes involving a hydrogenation step. It is, however, the discovery herein disclosed that the hydrogenation of pinene resin may be conducted under moderate conditions in the presence of black copper oxide catalyst with the result of moderately hydrogenating the resin to an extent satisfactory in precluding subsequent oxidation in the resin.

It is noteworthy that no special care of the catalyst is required; that is, it does not have to be preserved under special conditions as is the case with Raney nickel catalyst. Black copper oxide is not as energetic in its catalytic effect as metallic nickel, and in the hydrogenation of pinene resins tends to cause the introduction of hydrogen only into those points in the resin molecule which are most easily attacked. Experiment has shown that with all the catalysts of this group the quantity of catalyst used should be approximately 5% to 30% the weight of the resin subjected to hydrogenation, 5% of the catalyst being substantially the minimum with which the desired result will be secured. Although a percentage of the catalyst greater than 30% may be used, such greater percentage is under most circumstances unnecessary and performs no commensurately improved function in the hydrogenation reaction.

On the basis of a pinene resin having a melting point of about 95° C. to 125° C. (ball and ring) and considering specifically a pinene resin having an average molecular weight of about 800, 1.5 mols. of hydrogen can be introduced without difficulty by means of black copper oxide into each molecular equivalent of the pinene resin. With more difficulty, as much as 3 mols. or more of hydrogen can be introduced (other conditions being appropriate) by raising the temperature as high as is possible without decomposition of the resin and exercising care that the temperature does not exceed the permissible maximum while conducting the operation under relatively high pressure. With the lower-melting pinene resins, the molecular proportion of hydrogen introduced tends to be lower under the same hydrogenating conditions, but in any case, it is practical to introduce about .5 mols. of hydrogen into pinene resins of all molecular weights. Also, it has been found that black copper oxide may be used with any one or more of the catalysts comprised in the group of copper chromite, iron chromite, and nickel chromite.

In exemplifying the invention by means of the several specific examples hereinafter set forth, a uniform procedure was followed in order that the results might be comparative in their illustration. In the procedure of all the following examples, save those in which some step was unnecessary, a standard hydrogenation bomb was used; the resin was ground; and the ground resin, together with solvent and catalyst, was placed in the bomb and the bomb then closed. Hydrogen gas was admitted to the bomb from a suitable supply, as from cylinders of compressed hydrogen, at the pressure desired for each particular experiment. The whole assembly was then placed in rotating mechanism of suitable well-known kind and was warmed by gas burners. The bomb was fitted with a thermometer well carrying a thermometer in the usual manner.

During the progress of the hydrogenation, the rotating mechanism was stopped at intervals to observe data as to time, pressure, and temperature. When the reaction was completed, as indicated by cessation of pressure drop within the bomb, the temperature was restored to its initial value and the pressure was again observed. The catalyst was removed from the reaction solution by filtration and the solvent was removed by steam distillation. These procedures yielded a molten residual resin which was poured into a pan to harden. In operating to obtain recordable data, the usual precautions were taken to insure that the experiments were as quantitative as possible, and the bomb, therefore, was carefully calibrated to volume, and the volume of the reaction mixture deducted from it. The figure so secured represented the hydrogen gas volume in the bomb, which calculations gave the number of cubic centimeters of hydrogen gas employed.

To illustrate the invention, a hydrogenation treatment was conducted on a monomeric pinene fraction boiling from about 160° C. to 168° C.

*Example 1*

101.7 grams of the above noted pinene fraction was placed in the bomb without diluent and with 10 grams of black copper oxide catalyst. The maximum temperature of the reaction was 101° C. The initial pressure was 1015 lbs. per square inch, and the final pressure was 720 lbs. per square inch. 18,260 cc. of hydrogen was absorbed.

In figuring the above absorption of hydrogen, the charge composed of the pinene and the black copper oxide was placed in a bomb having a volume of 920 cc. The volume of charge was 100 cc., thus leaving a space having a volume of 820 cc. for the hydrogen gas. The run showed a pressure drop of 315 lbs. per square inch over the course of the reaction. 315 lbs. divided by 14.7 (1 atmosphere of pressure) equals 21.43. This multiplied by 820 with appropriate correction equals 18,260 cc. of hydrogen. Theoretically 109% hydrogenation at the double bond of the pinene molecules is thus shown.

Apparently there is an alkene double bond in the monomeric units of both alpha-pinene and beta-pinene which remains after polymerization in the terminal unit of each of the pinene polymers. Considering as appears to be a fact that this alkene double bond represents the point at which oxidation and other reactions proceed most readily, substantial advantage is obtained by hydrogenating in an order which substantially saturates that most susceptible point of attack. In hydrogenating pinene resin, however, it is a matter of general desirability to introduce as much hydrogen as may be done in the presence of the catalyst specified without utilizing conditions so drastic that they tend toward depolymerization or disintegration of the pinene polymers. In hydrogenating the pinene polymers, it has been found that the quantity of black copper oxide catalyst used, the pressure employed, and the maximum temperature at which hydrogenation is conducted, as well as the time of treatment, are important factors.

In conducting a series of experiments as illustrated in the following examples, it has been found that about 90° C. is the temperature at which hydrogen absorption begins to be substantial without using an unreasonably great quantity of catalysts, or unreasonably extending the time of treatment, or unreasonably increasing the pressure under which the hydrogenation is conducted. About 225° C. is the maximum temperature which may be used while insuring against de-polymerization of the resin. The desirable temperature range for the hydrogenation reaction may therefore be given as from about 90° C. to 225° C., and advantage is obtained by conducting the hydrogenation treatment stepwise, hydrogenating first at a temperature up to about 150° C. to 200° C., and then increasing the temperature when hydrogen absorption lags up to about 225° C. as a maximum. In conducting the hydrogenation, black copper oxide desirably is used in quantities of from 5% the weight of the resin to 30% the weight of the resin. If the quantity of catalyst used is as low as about 5% the weight of the resin, compensatory high pressure and high temperature should be employed in the hydrogenation treatment. In no instance is it desirable to employ a pressure substantially exceeding 2100 lbs. per square inch.

In the following composite example, the pinene resin used was a pinene resin polymerized from a cut of gum spirits of turpentine boiling within the approximate range of 160° C. to 168° C., which pinene resin had a melting point of 125° C., and a molecular weight of 800. That resin was dissolved in petroleum benzine for hydrogenation, and black copper oxide was used as the catalyst. The bomb used had a capacity of 920 cc., and the volume of each charge was close to 200 cc., leaving an approximate volume of 720 cc. available for hydrogen gas within the bomb. The example illustrates the control of hydrogenation with black copper oxide catalyst by varying the quantity of catalyst used, the pressure under which the hydrogenation is conducted, the temperature of the hydrogenation, and the time of treatment, the combination of these factors being varied in the several runs.

such as a pinene resin melting from about 90° C. (ball and ring) to 125° C. (ball and ring), the tendency toward oxidation is not great, and hydrogenation in an order as above effected reduces the tendency toward oxidation sufficiently to improve the resin hydrogenated in the several

*Example 2*

| Run No. | Hydrogenator charge | Initial press. | Final press. | Time in minutes | Max. temp. | Cc. of H₂ absorbed | Per cent of H₂ entered at the double bond |
|---|---|---|---|---|---|---|---|
| (a) | 100 g. pinene resin<br>100 cc. PB<br>10 g. CuO | 1,020 | 915 | 305 | 156 | 3,720 | 99.8 |
| (b) | 100 g. pinene resin<br>100 cc. PB<br>10 g. CuO | 625 | 545 | 95 | 199 | 3,060 | 76.6 |
| (c) | 100 g. pinene resin<br>100 cc. PB<br>10 g. CuO | 610 | 577 | 190 | 184 | 1,120 | 43.6 |
| (d) | 100 g. pinene resin<br>100 cc. PB<br>10 g. CuO | 1,000 | 953 | 165 | 195 | 2,585 | 63.0 |
| (e) | 100 g. pinene resin<br>100 cc. PB<br>15 g. CuO | 1,065 | 985 | 215 | 199 | 3,950 | 96.0 |
| (f) | 100 g. pinene resin<br>100 cc. PB<br>15 g. CuO | 1,000 | 895 | 420 | 214 | 5,025 | 123.0 |
| (g) | 100 g. pinene resin<br>100 cc. PB<br>30 g. CuO | 990 | 805 | 170 | 156 | 9,700 | 237.5 |

The foregoing example illustrates that as the factors of temperature and pressure are increased, that is, as they become more drastic, the greater will the amount of hydrogen be which is absorbed by the resin. This, also, is true in measure as to the quantity of catalyst used and the time of treatment. At the higher temperatures and pressures and with larger amounts of catalyst, correspondingly increased amounts of hydrogen can be caused to combine with the pinene polymers of the resin.

It will be noted that in run (g) of Example 2 the hydrogen absorption is 9,700 cc. of hydrogen. That figure indicates an absorption of about 2.5 mols. of hydrogen. In run (e) about 1 mol. of hydrogen is introduced, and in run (f) about 1.25 of hydrogen is introduced. In all examples hydrogenation introduction is at least equal to about .5 mol.

It has been above noted that pinene resin unaltered by treatment does not become excessively discolored on aging, and that the pinene resin unaltered by treatment has good solubility in the low-priced petroleum solvents, such as petroleum benzine. An unaltered pinene resin does, however, exhibit some tendency toward oxidation and insofar as such oxidation may become substantial, it detracts from the aging properties of the resin and many compositions in which it is included. In the higher-melting pinene resins, different exemplifications for different uses and conditions of use anticipated for the resin. The higher-melting pinene resins, such for example as those melting about 135° C. (ball and ring) and higher, are less susceptible to oxidation than the lower-melting pinene resins. Low-melting pinene resins, such as the oily resin composed chiefly of pinene dimers, with some inclusion of pinene trimers and other of the lower pinene polymers, are more susceptible to oxidation than are the higher-melting exemplifications, and with them, hydrogenation is of increased importance in insuring that the progress of oxidation will not destroy their effectiveness as plasticizers in compositions in which they are included. It will be seen from Example 3, which follows, that the hydrogenation of pinene dimer oil, which is a pinene resin melting below 0° C., follows the same principles as are involved in hydrogenating the higher-melting pinene resins in the presence of copper chromite. This example, like Example 2, is a composite example including several runs conducted under different conditions to illustrate the order of hydrogenation effected by controlling the several factors of pressure, temperature, quantity of catalyst, and time of treatment which have been above discussed.

*Example 3*

| Run No. | Hydrogenator charge | Initial press. | Final press. | Time in minutes | Max. temp. | Cc. of H₂ absorbed | Per cent of H₂ entered at the double bond |
|---|---|---|---|---|---|---|---|
| (a) | 100 g. dimer<br>10 g. CuO<br>No solvent | 1,015 | 945 | 330 | 175 | 4,580 | 56.0 |
| (b) | 100 g. dimer<br>10 g. CuO<br>No solvent | 980 | 872 | 165 | 217 | 6,300 | 74.0 |
| (c) | 100 g. dimer<br>10 g. CuO<br>No solvent | 1,060 | 805 | 180 | 153 | 14,330 | 174.0 |

It will be observed that in all the runs of Example 3, the introduction of hydrogen was in a molecular proportion of at least .5 mol. to each resin molecule, at least two of the three factors of pressure, temperature, and quantity of catalyst being greater than is necessary in obtaining the same proportional saturation of double bonds in the high-melting resin of Example 2.

The above is further evidence of the fact that the general effect of increased pressure, like that of increased temperature, is to induce increased quantities of hydrogen to be absorbed by the resin, and that other things being equal, this result is also roughly proportional to the use of increased quantities of catalyst. Thus in run (c) of Example 3 above, a very large quantity of catalyst is used, and this large proportional amount of catalyst is accompanied by the condition of high pressure for the hydrogenation. In run (b), a large quantity of catalyst is used, the pressure is relatively high, and the temperature approaches the maximum permissible temperature for the hydrogenation.

The above consideration of the hydrogenation of pinene resin in the presence of black copper oxide catalyst shows that there is close parallel between the hydrogenation of this resin and the hydrogenation of coumarone-indene resin as disclosed in companion application Serial No. 512,787, filed Dec. 3, 1943. Whereas the existence of a terminal alkene double bond in the pinene polymer has been assumed, the presence of such lone terminal double bond is not so thoroughly established as is the presence of an analogous bond in the polymers of coumarone and indene. It is, however, a fact that the two resins (the pinene resin and the coumarone-indene resin) act so analogously under hydrogenation in the presence of black copper oxide catalyst that the retention of such alkene double bond, or analogous point of attack, in the pinene polymers appears to be a reasonable and relatively safe assumption.

The above discussion and examples deal with and exemplify the use of hydrogenation in the presence of black copper oxide as the sole catalyst used, and demonstrate the satisfactory effect of hydrogenation in the presence of that catalyst. It is to be understood, however, that the hydrogenation may be conducted in the simultaneous presence of black copper oxide and one of the chromite catalysts, the use of which is disclosed and exemplified in companion application Serial No. 512,785, filed Dec. 3, 1943. That is, the black copper oxide may be used in varied proportions with one or more of copper chromite, iron chromite, and nickel chromite. When so used the diversity in the combined catalyst appears to give a catalyst-promoting effect, so that a given quantity of the combined catalyst is somewhat more effective than the same quantity of either catalyst alone. That is, the simultaneous use of black copper oxide and one or more catalysts from the group consisting of copper chromite, iron chromite, and nickel chromite appears to indicate that in the presence of the other both the black copper oxide and the chromite catalyst are slightly more effective than either when used by itself. Insofar as quantity of such mixture, either made in advance or in the bomb, is concerned, it is desirable to follow the catalyst proportions given above for black copper oxide when used alone. That is, it is desirable to use a weight of combined catalyst equal to from 5% to 30% the weight of the pinene resin which is subjected to treatment.

Without regard to the point of entry of the hydrogen into pinene resin molecules, the property of pinene resin as to its resistance to discoloration and solubility in aliphatic solvents renders any substantial hydrogenation of the resin useful. That is, any substantial blocking of the tendency toward oxidation, such as that resulting from the introduction of about .5 mol. of hydrogen into the resin molecule, substantially increases the value of the resin. The use of the black copper oxide catalyst which is of low cost, which presents no difficulty in storage, and which functions under moderate conditions of temperature and pressure, is, therefore, advantageous.

It is to be understood that in the foregoing where melting point is given without qualification, it is to be taken as determined by the ball and ring method of melting point determination. It is explained that the term "pinene" resin is to be taken as inclusive of resins composed of the polymers of either alpha-pinene, beta-pinene, or a mixture of the polymers of those substances, together with such incidental proportions of other terpene components as are normally associated in manufacture of the resin. Where pressure is given in pounds without explanation, it is to be taken as meaning pounds per square inch. Where parts or proportions are given without express or implied qualification as to comparison of volumes, it is to be taken that parts by weight is intended.

What is claimed is:

1. A method of hydrogenating polypinene resin which comprises the steps of bringing such resin into contact with hydrogen in the presence of black copper oxide under such temperature and pressure conditions as chemically to introduce about .5 mol. to 3 mols. of hydrogen per molecular equivalent of polypinene resin structure, the hydrogenation being carried out at a temperature ranging from about 90° C. to 225° C. and at an initial pressure not substantially exceeding 2100 pounds per square inch.

2. A method of hydrogenating polypinene resin which comprises the steps of bringing such resin into contact with hydrogen in the presence of black copper oxide under such temperature and pressure conditions as chemically to introduce about .5 mol. to 3 mols. of hydrogen per molecular equivalent of polypinene resin structure, the hydrogenation carried out at a temperature ranging from about 90° C. to 225° C., being effected stepwise by controlling the temperature in such manner that it does not exceed the range of 150° C. to 200° C. in the first stage thereof, with the balance of the hydrogenation being carried out at higher temperatures ranging up to about 225° C. and at an initial pressure not substantially exceeding 2100 pounds per square inch.

3. A method of hydrogenating polypinene resin which comprises the steps of bringing such resin into contact with hydrogen in the presence of black copper oxide under such temperature and pressure conditions as chemically to introduce about .5 mol. to 3 mols. of hydrogen per molecular equivalent of polypinene resin structure, the said polypinene resin being in dissolved form and the catalyst constituting at least about 5% to 30% by weight of the said resin, at a temperature of from 90° C. to 225° C. and under a pressure not substantially exceeding 2100 pounds per square inch.

MARIE O. CARMODY,
Administratrix of the Estate of William H. Carmody, Deceased.

REFERENCES CITED

The following references are of record in the file of this patent:

UNITED STATES PATENTS

| Number | Name | Date |
|---|---|---|
| 2,152,533 | Carmody, W. | Mar. 28, 1939 |
| 2,249,112 | Carmody, M. | July 15, 1941 |

OTHER REFERENCES

Waterman et al., Rec. Trav. Chim., vol. 55, pages 7 to 12 (1936).

Adkins et al., J. Ameri. Chem. Soc., vol. 53, pages 1091 to 1095 (1931).

Ellis, Hydrogenation of Organic Substances, 3rd ed., Van Nostrand 1930, page 158.

Durland et al., J. Amer. Chem. Soc., vol 60, pages 1501–5 (1938), as abstracted in Chem. Abstracts, vol. 32, 1938, page 5824.

Tuda et al., Berichte 72 B, pages 716–23 (1938), as abstracted in Chem. Abstracts, vol. 33, page 4979 (1939).

Certificate of Correction

Patent No. 2,416,902. March 4, 1947.

WILLIAM H. CARMODY, BY
MARIE O. CARMODY, ADMINISTRATRIX

It is hereby certified that error appears in the printed specification of the above numbered patent requiring correction as follows: Column 6, Example 3, second column thereof, the indistinct portion under the heading "Hydrogenator charge" should appear as shown below—

$$\begin{cases} 100 \text{ g. dimer} \\ 10 \text{ g. CuO} \\ \text{No solvent} \end{cases}$$
$$\begin{cases} 100 \text{ g. dimer} \\ 20 \text{ g. CuO} \\ \text{No solvent} \end{cases}$$
$$\begin{cases} 100 \text{ g. dimer} \\ 30 \text{ g. CuO} \\ \text{No solvent} \end{cases}$$

and that the said Letters Patent should be read with this correction therein that the same may conform to the record of the case in the Patent Office.

Signed and sealed this 8th day of July, A. D. 1947.

[SEAL]

LESLIE FRAZER,
*First Assistant Commissioner of Patents.*

UNITED STATES PATENTS

| Number | Name | Date |
|---|---|---|
| 2,152,533 | Carmody, W. | Mar. 28, 1939 |
| 2,249,112 | Carmody, M. | July 15, 1941 |

OTHER REFERENCES

Waterman et al., Rec. Trav. Chim., vol. 55, pages 7 to 12 (1936).

Adkins et al., J. Ameri. Chem. Soc., vol. 53, pages 1091 to 1095 (1931).

Ellis, Hydrogenation of Organic Substances, 3rd ed., Van Nostrand 1930, page 158.

Durland et al., J. Amer. Chem. Soc., vol 60, pages 1501-5 (1938), as abstracted in Chem. Abstracts, vol. 32, 1938, page 5824.

Tuda et al., Berichte 72 B, pages 716-23 (1938), as abstracted in Chem. Abstracts, vol. 33, page 4979 (1939).

Certificate of Correction

Patent No. 2,416,902.   March 4, 1947.

WILLIAM H. CARMODY, BY
MARIE O. CARMODY, ADMINISTRATRIX

It is hereby certified that error appears in the printed specification of the above numbered patent requiring correction as follows: Column 6, Example 3, second column thereof, the indistinct portion under the heading "Hydrogenator charge" should appear as shown below—

$$\begin{cases} 100 \text{ g. dimer} \\ 10 \text{ g. CuO} \\ \text{No solvent} \end{cases}$$
$$\begin{cases} 100 \text{ g. dimer} \\ 20 \text{ g. CuO} \\ \text{No solvent} \end{cases}$$
$$\begin{cases} 100 \text{ g. dimer} \\ 30 \text{ g. CuO} \\ \text{No solvent} \end{cases}$$

and that the said Letters Patent should be read with this correction therein that the same may conform to the record of the case in the Patent Office.

Signed and sealed this 8th day of July, A. D. 1947.

[SEAL]

LESLIE FRAZER,
*First Assistant Commissioner of Patents.*